(12) United States Patent
Cox

(10) Patent No.: US 6,820,146 B2
(45) Date of Patent: Nov. 16, 2004

(54) FILTER DRIVER FOR BLOCKING ACCESS BY HOST TO DEVICES

(75) Inventor: David Pevton Cox, Santa Barbara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 249 days.

(21) Appl. No.: 10/260,291

(22) Filed: Oct. 1, 2002

(65) Prior Publication Data

US 2004/0064604 A1 Apr. 1, 2004

(51) Int. Cl.[7] ............................. G06F 3/00; G06F 13/12
(52) U.S. Cl. ........................... 710/74; 710/36; 719/321; 713/201
(58) Field of Search ............................. 710/36, 74, 72; 711/100, 111; 713/200–201; 719/321

(56) References Cited

U.S. PATENT DOCUMENTS

| | | | | |
|---|---|---|---|---|
| 6,061,753 A | * | 5/2000 | Ericson | 710/107 |
| 6,263,445 B1 | * | 7/2001 | Blumenau | 713/201 |
| 6,393,539 B1 | * | 5/2002 | Nguyen et al. | 711/164 |
| 2003/0140191 A1 | * | 7/2003 | McGowen et al. | 710/302 |
| 2003/0225928 A1 | * | 12/2003 | Paul | 709/321 |
| 2004/0003135 A1 | * | 1/2004 | Moore | 709/321 |

\* cited by examiner

*Primary Examiner*—Kim Huynh

(57) ABSTRACT

A filter driver code arrangement (on a computer-readable medium for use in a system having a bus, a host connected to the bus and one or more devices connected to the bus), which prevents access by the host to any of the devices for which the host does not have respective access permission. Such a filter driver includes: an intercept code portion to intercept a set of data identifying one or more devices connected to the bus, respectively; a determination code portion to determine, based upon the data set and a permission set representing permission relationships between the host and the one or more devices, whether the host has permission to access each of the one or more devices; and a change code portion to change the data set to block access by the host to any of the one or more devices for which the host does not have access permission.

25 Claims, 7 Drawing Sheets

FILTER DRIVER FOR BLOCKING ACCESS BY HOST TO DEVICES

BACKGROUND OF THE INVENTION

The WINDOWS driver model (WDM) is a driver technology developed by the MICROSOFT Corporation that supports drivers which are compatible for WINDOWS 98, 2000, ME AND XP. WDM allots some of the work of the device driver to portions of the code that are integrated into the operating system. These portions of code handle low-level buffer management, including direct memory access (DMA) and plug-n-play (PnP) device enumeration.

A DRIVER_OBJECT data structure, corresponding to a single loaded device driver according to WDM, contains a table of function pointers referred to as the dispatch table. The numerical values used to index into the table, namely to find specific functions, are called function codes and are given symbolic names that refer to a type of input/output (IO) such as READ and WRITE or refer to other requests such as CREATE, DEVICE_CONTROL and PnP.

The function located in the table at the corresponding index is expected to implement logic for carrying out such an IO request. The operating system delivers IO request packets (IRPs) to these functions. The operating system also, for each IRP, identifies the device for which the request is intended, in the form of a DEVICE_OBJECT data structure. Such a DEVICE_OBJECT was previously initialized by the driver and represents a single device handled (driven) by the driver. A driver defines its own dispatch functions and inserts them into the dispatch table in its DRIVER_OBJECT at the time the driver initializes itself.

A device node (devnode) is the context (set of data structures and configuration storage) representing a single device within a WDM operating system. If the device is active (connected and enabled for use), then (in the kernel) such a context will include a stack of device object structures, typically one per driver in the layered driver architecture for that type of device. By convention, stacks are said to be built from the bottom up (with the device being below the bottom of the stack) and dismantled from the top down. It is noted that being lower in the stack connotes being closer in terms of directness of communication to the device, while higher connotes being farther away.

Device objects (DOs) in the stack fall into one of three categories. The bottom-most device object is created by the driver for the bus that provides access to the device and is called the physical device object (PDO). The bus driver provides raw communications capability to the device, but little in the way of higher-level device-specific functionality.

Typically a function device object (FDO) is created by a driver which provides access to device-specific and higher-level capabilities of the device. An FDO will be located higher in the device stack than a PDO. In addition to the PDO and FDO, there may optionally be one or more filter device objects (FiDOs). Such FiDOs may be located in the device stack between the PDO and FDO, or above the FDO.

FIG. 1 is a software block diagram that illustrates the layered relationships of objects according to the WDM architecture. Such a WDM architecture 100 includes a device 102 and a bus 104 to which the device 102 is physically connected. A host computing device 105 is also connected to the bus 104. The host 105 includes a variety of software such as an enumerator of bus devices (hereafter DO enumerator) 110, application 106, a PnP manager 108, a bus function driver 112, and a device function driver 116. It is noted that there also may be one more lower filter drivers and one or more upper filter drivers or none at all.

When a device 102 is connected to a bus 104, the bus driver 112 notifies the operating system of a change on the bus. The operating system, i.e., the PnP manager 108, issues a query to the bus 104 via an IRP sent downward in the layered architecture instructing the bus function driver 112 to discover (or enumerate) the devices currently connected to the bus 104. In response to this query, the bus function driver 112 generates PDOs for any newly-connected/discovered devices and provides a set of pointers to the newly-generated PDOs as well as previously-existing PDOs (corresponding to previously albeit currently connected devices). Strictly speaking, the set of DOs represented by the returned pointers are not PDOs until the operating system, namely the PnP manager, examines the set and becomes aware of these DOs.

The PnP manager 108 locates and loads into volatile memory (if not already loaded) the function driver and any filter drivers for the newly-connected devices. It then gives each filter driver and/or function driver an opportunity to create and attach corresponding FiDOs or FDOs to the stacks rooted in the new PDOs, respectively. Ultimately, an application 106 can access a device 102 i.e., consume the functional abilities of the device 102, by passing IRPs through the stack.

When the device is to be disconnected or disabled, the stack must be destroyed. From the top down, under the coordination of the PnP manager 108, each driver detaches its device object from the stack and deletes it.

More detail is provided in FIG. 5, which is a sequence diagram according to the unified modeling language (UML) principles. The sequence 500 in FIG. 5 depicts the various interactions between the device 102, the bus 104, the bus driver 112, the PnP manager 108, the device lower filter driver 114, the device function driver 116, the device upper filter driver 118 and the application 106. The device 102 connects to the bus 104 at message 518. The bus 104 then notifies the bus driver 112 of a change in connected devices at message 520. The bus driver 112 notifies the PnP manager 108 of a change in connected devices at message 522. The PnP manager 108 queries the bus 104 to obtain a set of connected devices via message 524, e.g., an IRP, to the bus driver 112. If not already known by the bus driver 112, then the bus driver 112 queries the bus 104 to discover the connected devices via the query message call 526. The bus driver 112 creates PDOs for newly discovered devices and returns pointers to (addresses of) all PDOs representing devices connected to the bus to the PnP manager 528.

Upon receiving the set of PDOs, the PnP manager enters a loop 530 by which it handles any PDO in the set of which the PnP manager was not previously aware. At message 532, the PnP manager passes one of the PDOs to any device lower filter drivers 114 that might be present. In response, each device lower filter driver attaches a new FiDO to the corresponding stack 128 (see legend 534 in FIG. 5). Then the PnP manager 108 passes the PDO to the device function driver 116, at message 536.

In response, the device function driver 116 attaches a new, named FDO to the device stack 128 and correspondingly registers device-class interfaces (see legend 538) by which consumers can access the device stack. Next, the PnP manager 108 passes the PDO to any device upper filter drivers 118, at message 540. In response, each device upper filter driver 118 attaches a new FiDO 126 to the device stack 128 (see legend 542). Lastly, the PnP, manager 108 notifies applications 106 of the availability of the new device 102, at message 544. In response, the applications 106 may utilize (consume the services of) the device 102 (see legend 546).

Returning to FIG. 1, a stack 134 for the bus 104 is depicted. The stack 134 includes a PDO for the bus 130 (generated by the bus DO enumerator 110) and a bus FDO 132 (generated by the bus function driver 112).

A stack 128 for the device 102 has also been created. The stack 128 includes a PDO 120 (generated by the bus function driver 112), and (possibly) a FiDO 122 (generated by the optional device lower filter driver 114, if present), an FDO 124 (generated by the device function driver 116) and (possibly) a FiDO 126 (generated by the device upper filter driver 118, if present). In other words, if the device lower filter driver 114 and/or the device upper filter driver 118 are not present, then the FiDO 122 and/or the FiDO 126 will not be present, respectively.

In a storage area network (SAN), a device (not depicted) can be sub-divided into smaller units representing different functions, known as logical units (LUNs). Device 102 may be such a LUN. A device or LUN can represent a type of massive non-volatile storage, configuration functionality, monitoring functionality and/or mechanical functionality (such as tape changing), etc. The host 105 can have an application 106 that stores data to, reads data from and/or otherwise utilizes the functionality of device 102, i.e., consumes the services of the device 102. In some SANs, there can be multiple non-volatile memory devices or other devices 102, some of which the host 105 might not have permission to access.

Control over access to certain ones of the devices 102 (also known as LUN masking) has been implemented within the bus driver 112 according to the Background Art. Given the many different types of buses 104 and corresponding drivers 112, the resulting variety of control techniques embedded within the various drivers 112 is unwieldy unless the various bus vendors 104 agree to and abide by a standardized mechanism within the bus driver 112. Such cooperation has not been forthcoming.

SUMMARY OF THE INVENTION

A filter driver code arrangement (on a computer-readable medium for use in a system having a bus, a host connected to the bus and one or more devices connected to the bus), which prevents access by the host to any of the devices for which the host does not have respective access permission. Such a filter driver includes: an intercept code portion to intercept a set of data identifying one or more devices connected to the bus, respectively; a determination code portion to determine, based upon the data set and a permission set representing permission relationships between the host and the one or more devices, whether the host has permission to access each of the one or more devices; and a change code portion to change the data set to block access by the host to any of the one or more devices for which the host does not have access permission.

Additional features and advantages of the invention will be more fully apparent from the following detailed description of example embodiments, the appended claims and the accompanying drawings.

The accompanying drawings are: intended to depict example embodiments of the invention and should not be interpreted to limit the scope thereof; and not to be considered as drawn to scale unless explicitly noted.

Figure 5:
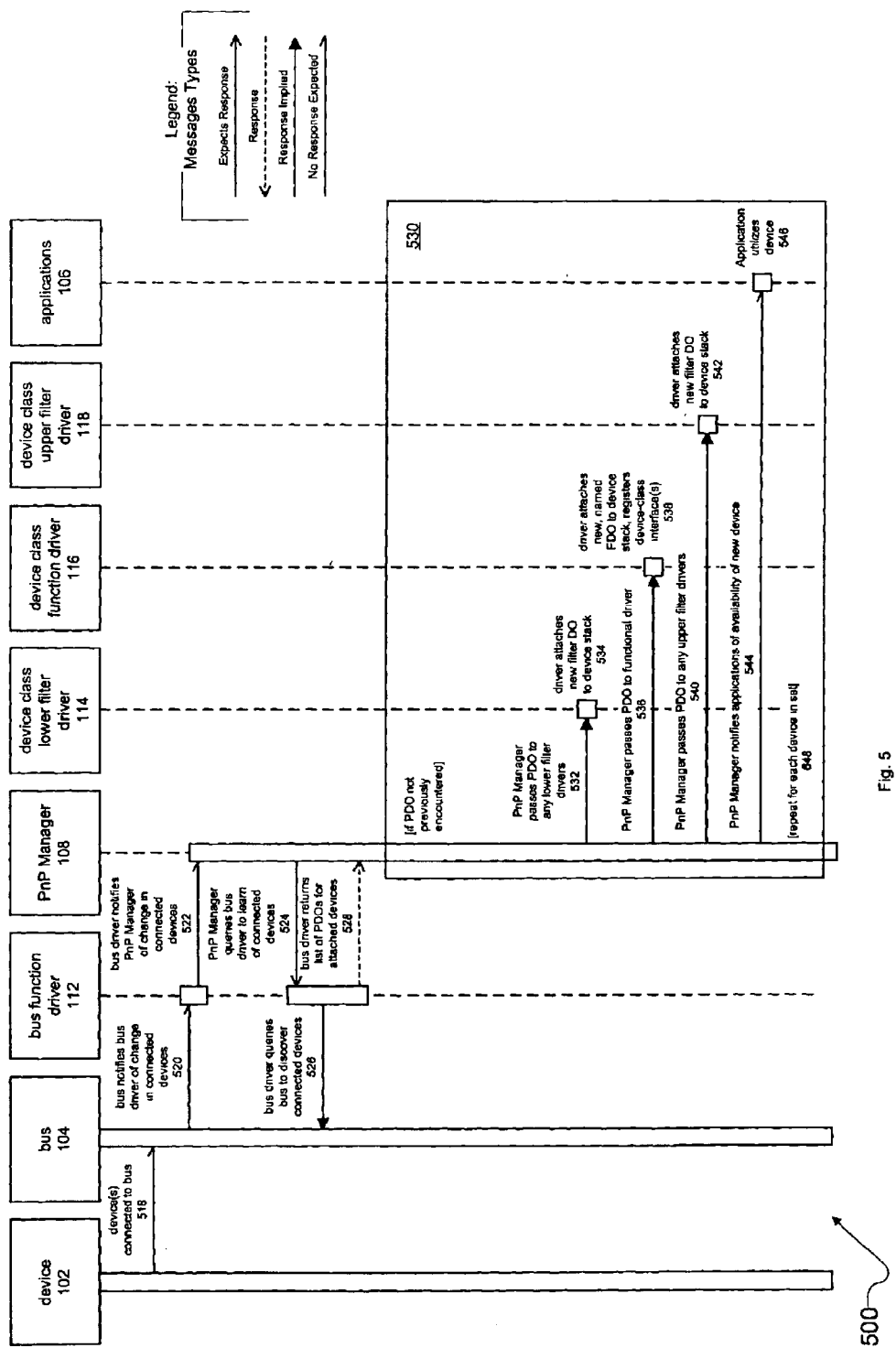
FIG. 5 is a sequence diagram according to the Background Art.
Figure 6:
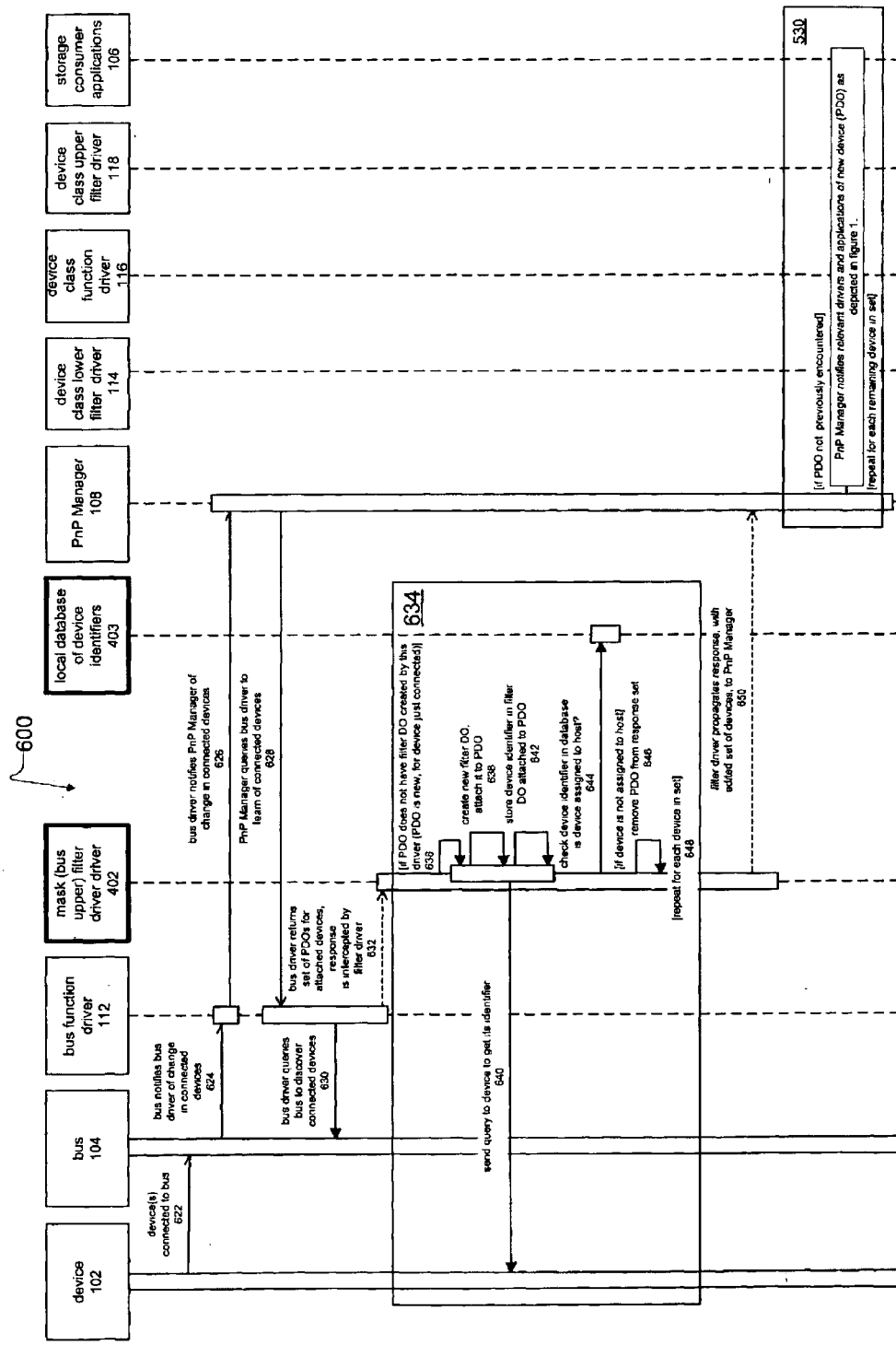
FIG. 6 is a sequence diagram according to an embodiment of the invention.
Figure 7:
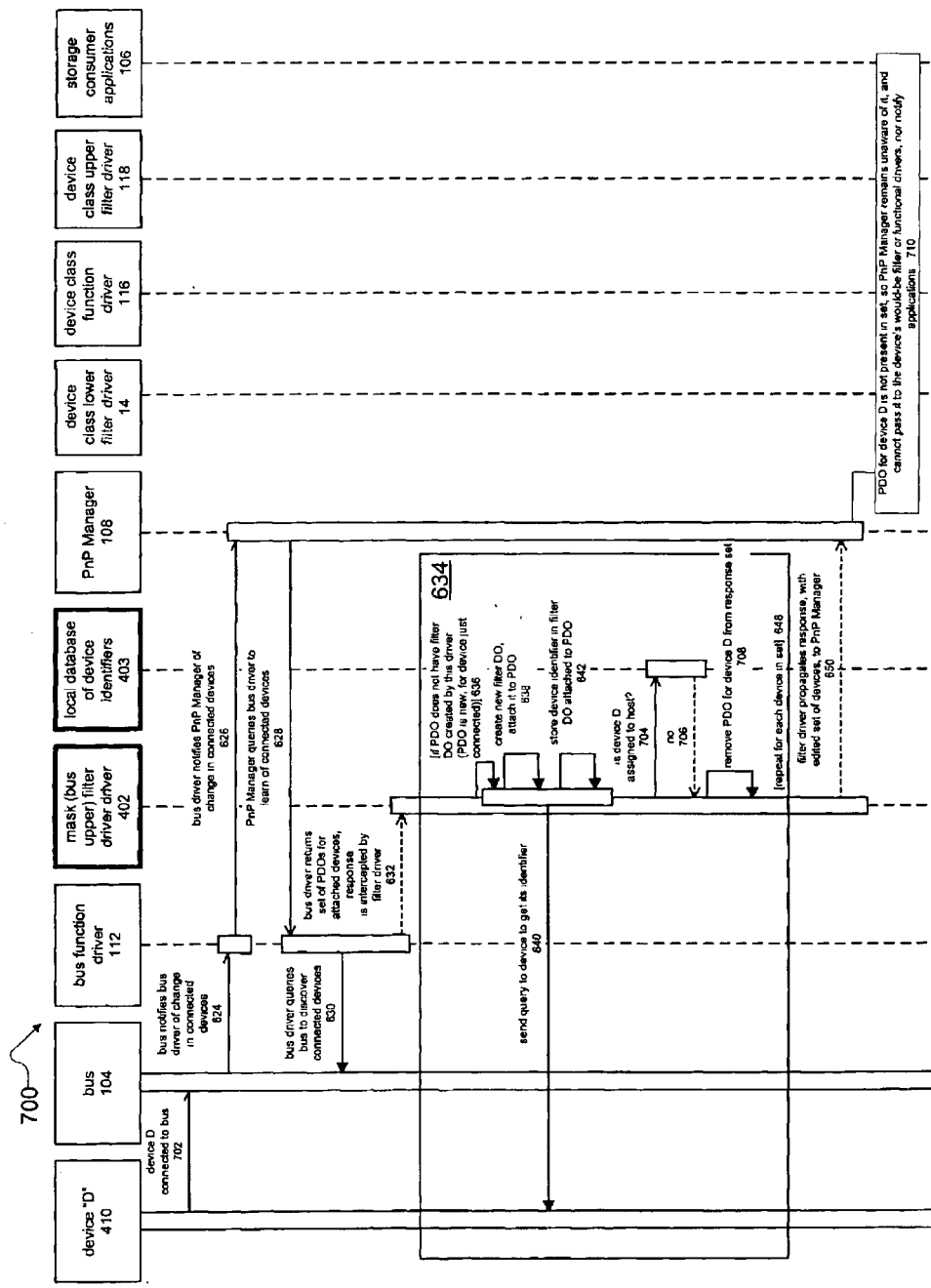
FIG. 7 is a sequence diagram according to an embodiment of the invention.

FIGS. 5–7 are UML sequence drawings. Messages are depicted with arrows of different styles. A⎯⎯→indicates a message that expects a response message. A←⎯⎯indicates a response message. A⎯⎯→indicates a message for which the response is implied. And a⎯⎯→ indicates a message for which no response is expected.

DETAILED DESCRIPTION OF THE PREFERRED EMBODIMENTS

Embodiments of the invention provide low level, (e.g., kernel-mode driver) software that prevents users, applications and/or higher-level drivers (including the input/output (IO) systems of the operating system) from accessing particular devices. Such software can be part of a greater system that coordinates access privileges of several hosts to network devices. Such software is loaded on the host that is also running applications that might access the devices if given permission to do so.

Figure 2:
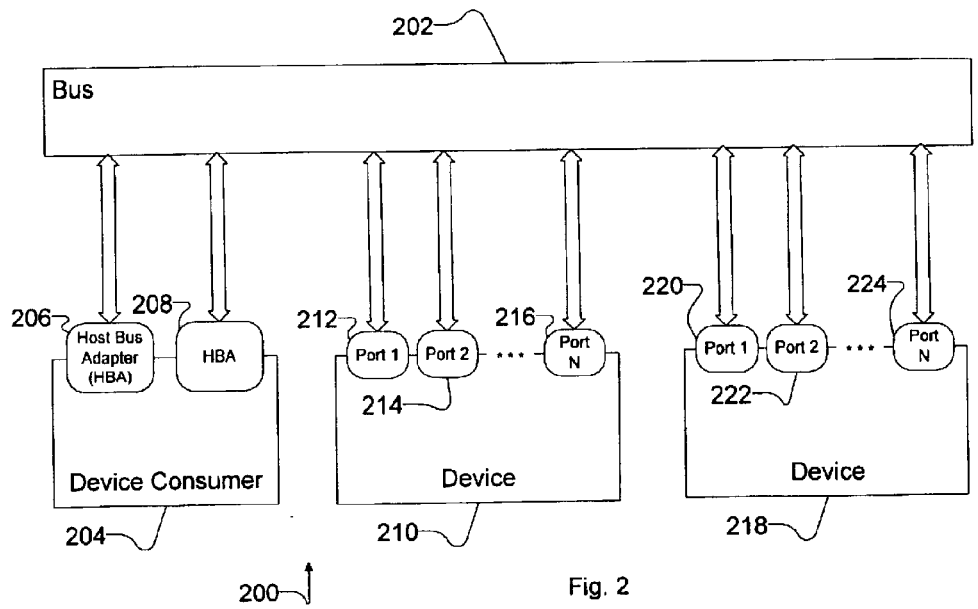
FIG. 2 is a hardware block diagram according to the an embodiment of the invention.

FIG. 2 depicts a hardware block diagram of a system 200 according to an embodiment of the invention that incorporates software according to an embodiment of the invention. The system 200 includes a bus (e.g., SCSI, Ethernet (iSCSI/IP/Gbit Ethernet), fibre channel, etc.) 202 to which are connected a consumer of device services (hereafter a device consumer) 204, a device 210 and a device 218.

The device consumer 204 includes host bus adapters (HBAs) 206 and 208 that permit the device consumer 204 to connect to and interact with the bus 202. The device 210 has port 1 (212), port 2 (214), ... port N (216). Device 218 has port 1 (220), port 2 (222), ... port N (224). For simplicity of disclosure, only two devices 210 and 218 and two HBA's 206 and 208 have been depicted, but fewer or more devices could be attached to the bus and fewer (1) or more HBAs could be present in the consumer depending upon the particular circumstances of a situation.

Figure 3:
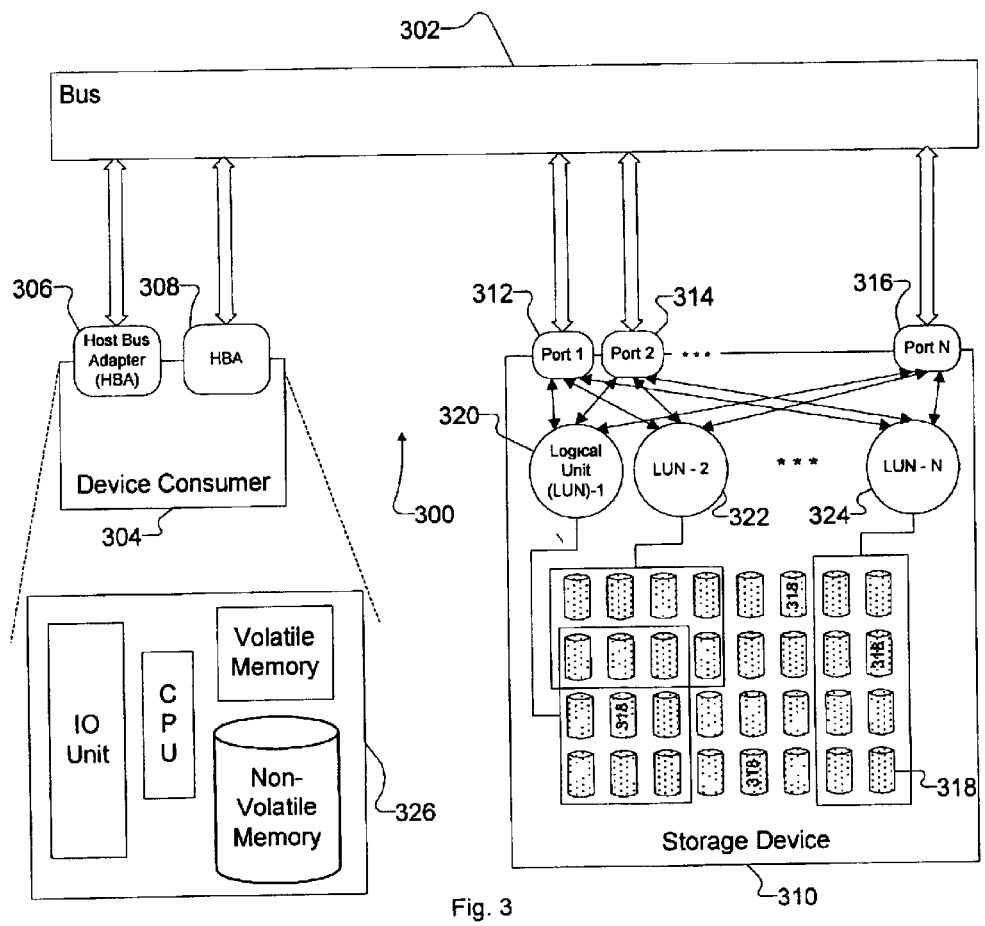
FIG. 3 is a hardware block diagram according to an embodiment of the invention.

FIG. 3 depicts a hardware block diagram corresponding to a particular type of system 200, namely a storage area system or storage area network (SAN) 300. The SAN 300 includes a bus 302, a device consumer 304 and a non-volatile storage device 310.

The device consumer 304 can include HBAs 306 and 308. Fewer or greater numbers of HBAs 306/308 can be provided depending upon the circumstances of a situation.

The device consumer 304 can take the form of a computer 326 including at least a CPU, input device(s), output device(s) and memory. For example, the computer 326 has been depicted as including a CPU, an IO device, volatile memory such as RAM and non-volatile memory such as ROM, flash memory, disc drives and/or tape drives.

The storage device 310 includes port 1 (312), port 2 (314), . . . port N (316) and logical units (LUNs) 1, 2, . . . N. Also included in the storage device 310 are non-volatile memories 318 such as disc drives, tape drives and/or flash memory. To remind the reader of the logical nature of a LUN, a simplistic mapping between the LUNs 320, 322 and 324 and to physical memory devices 318 has been illustrated in FIG. 3. For the purposes of this discussion, a LUN will be considered interchangeable with a device 210 or 218.

In the environment of a storage area network 300, a storage area manager program operates to prevent consumer applications running on device consumers 304 from accessing LUNs to which the host (or device consumer) 304 has not been granted access by the storage manager. In a WDM architecture, a consumer application on a host device 304 cannot see a device 320, 322 and/or 324 if there is no FDO in the stack of the device visible to an application running on the host. So if the generation of such an FDO can be suppressed, then the application cannot access the device. Also, there can be circumstances in which no FDO is present but the device can still be accessed, hence the ability to hide the PDO can be desirable.

How can the generation of FDOs and FiDOs by the function drivers and the filter drivers be suppressed? One way is to prevent the PnP manager from passing the device PDO to the function and filter drivers (notifying the drivers).

So how is the notifying of such drivers by the PnP manager suppressed? Recalling that the filter and function drivers are notified by the PnP manager in response to the PnP manager receiving PDOs corresponding to those drivers, one way to prevent the notification of such drivers is to prevent the PnP manager from receiving PDOs for the devices to which access by the host device has restricted. This similarly suppresses notification of other consumers that might access the device via its PDO despite the lack of an FDO in the stack.

According to an embodiment of the invention, the PnP manager 108 is prevented from seeing those PDOs, to which the PnP manager's host is not granted access, by loading a filter driver that selectively edits the set of PDO pointers returned by the bus driver to the PnP manager.

Figure 1:
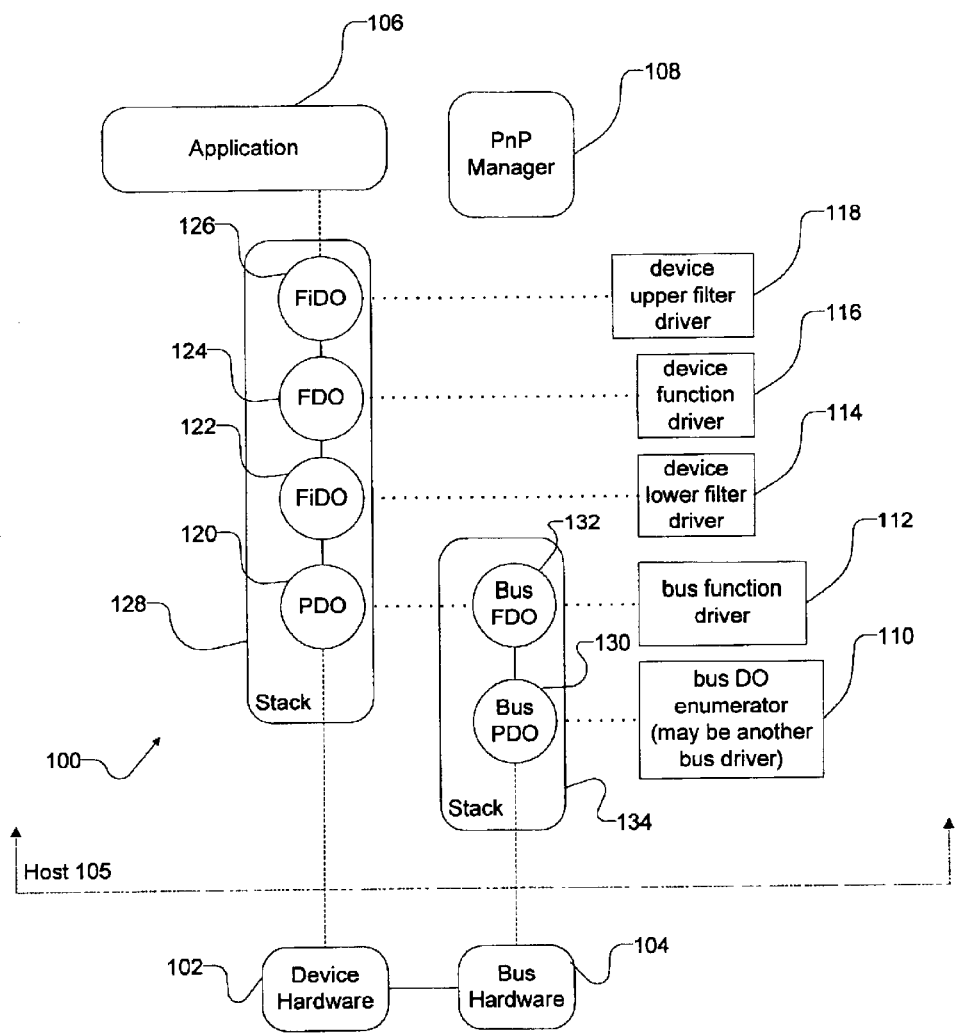
FIG. 1 is a software block diagram according to the Background Art.
Figure 4:
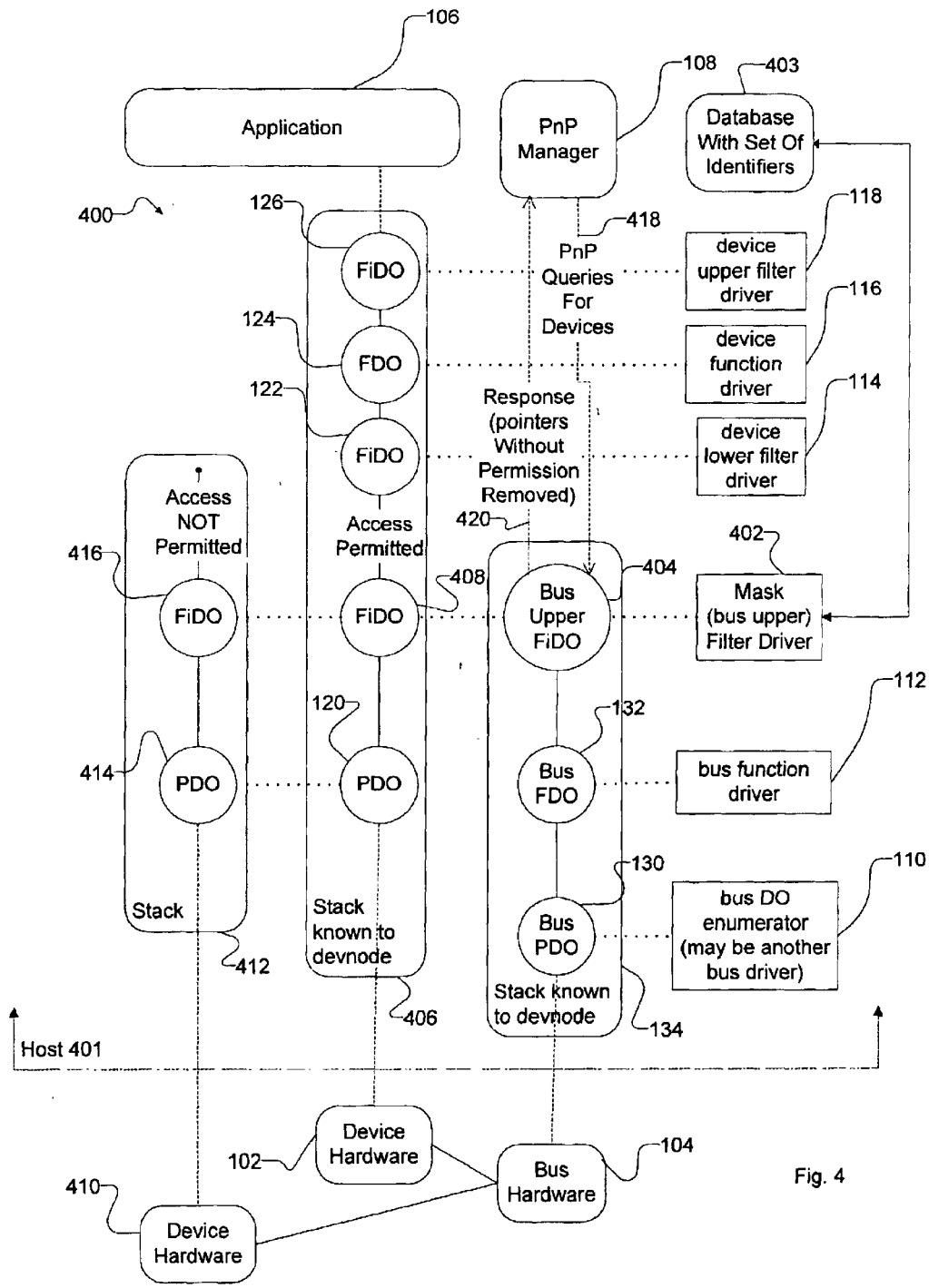
FIG. 4 is a software block diagram according to an embodiment of the invention.

FIG. 4 depicts a software block diagram according to an embodiment of the invention. FIG. 4 has some similarities to Background Art FIG. 1. As such, some of the blocks in FIG. 4 are given the same number as in FIG. 1 with little to no further description.

The system 400 in FIG. 4 includes a device 102, a device 410, and a host 401 each of which is connected to a bus 104. The host (or device consumer) 401 includes an application program 106, a plug-n-play (PnP) manager 108, a bus DO enumerator 110, a bus function driver 112, a mask filter driver 402, a database 403 (having a set of identifiers of devices for which the host 401 does/does-not have access permission), an optional device lower filter driver 114, a device function driver 116 and an optional device upper filter driver 118.

Communications between the bus driver 112 and the PnP manager 108 pass through the mask filter driver 402. The filter driver 402 is given the adjective mask because it selectively controls which PDOs, i.e., devices, the PnP manager 108 can see.

A stack 134 is created for the bus 104. Subsequently a stack 406 is created for the device 102 and a stack 412 is created for the device 410.

In FIG. 4, it is assumed for the sake of discussion that permission has been granted for the host 401 to access the device 102 but does not have permission to access the device 410. During assembly of the stack 134, the mask filter driver will create a bus upper filter device object (bus upper FiDO) 404 in the stack 134. Similarly, the mask filter driver 402 will generate a FiDO 408 during assembly of the stack 406 and an FiDO 416 during assembly of the stack 412.

FIG. 6 is a sequence diagram according to an embodiment of the invention. The sequences 600 correspond to what takes place during the generation of the stack 406 in FIG. 4. At message 622, the device 102 connects to the bus 104. At message 624, the bus 104 notifies the bus function driver 112 of a change in the devices connected to it. At message 626, the bus driver 112 notifies the PnP manager 108 of a change in the connected devices via, e.g., a kernel function named lo Invalidate Device Relations ( ).

At message 628, the PnP manager responds by querying the bus driver 112 to learn of the devices connected to the bus 104 via an IRP. At message 630, the bus driver 112 queries the bus 104 to discover connected devices. At response 632, the bus driver 112 returns a set of pointers to PDOs representing the attached devices. Though the bus driver 112 intends for the set to be received by the PnP manager 108, it is intercepted by the mask filter driver 402. The mask filter driver 402 then enters a loop 634 to determine if new PDOs are present.

At subroutine call 636, the mask filter driver 402 examines the current PDO from the set and determines whether it existed previously. The mask filter driver 402 can do this by checking whether a corresponding FiDO 408/416 exists in the stack 406/412. If no FiDO 408/416 yet exists, the mask filter driver 402 creates the device lower FiDO 408/416 and attaches it to the stack 406/412, at procedure 638. Next the mask filter driver 402 sends query message 640 to the device to retrieve its unique identifier. At procedure 642, the mask filter driver 402 stores the identifier of the device 102, in a private field of the FiDO 408. A private field is part of a device extension structure associated with the device object. The field is private in the sense that only the driver that creates the DO can interpret the data stored in the device extension structure.

At message 644, the mask filter driver 402 checks whether the device identifier in the device extension of FiDO 408/416 corresponds to a device for which the host 401 should have access. The mask filter driver 402 can do this by comparing the device identifier against members of the set of identifiers within the database 403. The set within database 403 can include identifiers of devices which the host 401 has permission to access or can include identifiers of devices for which the host 401 does not have permission to access.

FIG. 6 assumes the circumstance in which the set within database 403 includes identifiers of devices for which the host 401 has permission. So if the device identifier indicated by one of the private fields in the device extension of FiDO 408 is not present in the set within database 403, that would mean that the host 401 does not have access permission. Where the host 401 does not have access permission, the mask filter driver 402 would edit the set of pointers to remove the pointer pointing to the PDO corresponding to the device for which the host 401 does not have access permission, at procedure 646.

It is to be remembered that FIGS. 6 and 4 assume that the host 401 does have permission to access the device 102. Hence, message 646 does not cause the PDO corresponding to the device 102 to be removed from the set of pointers because it does not occur in the loop iteration for device 102.

At legend 648 within the loop 634, the filter driver 402 repeats the loop 634 for each of the remaining new PDOs in the set. After exiting the loop 634, at message 650, the mask filter driver 402 propagates an edited set of PDO pointers to the PnP manager 108. Then, the PnP manager 108 enters the loop 530 discussed in Background Art FIG. 5.

FIG. 7 is a sequence diagram depicting the sequences related to the creation of the stack 412 (corresponding to device 410) in FIG. 4. FIGS. 4 and 7 assume that the host 401 does not have permission to access the device 410. FIG. 7 is similar to FIG. 6. Hence, similar messages will be labeled with the same reference number and will not be discussed in detail.

At message 702, the device 410 connects to the bus 104. Then messages 624, 626, 628, 630 and 632 are exchanged similarly to FIG. 6. After message 632, the mask filter driver 402 enters the loop 634. For the sake of brevity, it will be assumed that the first new PDO examined by the mask filter driver 402 corresponds to the device 410. That is, it is PDO 414 in FIG. 4. Initially, message 636, 638, 640 and 642 are exchanged similarly to FIG. 6. At message 704, the mask filter driver 402 checks whether the device 410 is assigned to the host 401, i.e., whether the host 401 has permission to access the device 410.

At message 706, the database containing a set of identifiers responds that the host 401 does not have permission to access the device 410. At procedure 708, the mask filter driver 402 removes the pointer for the PDO 414, corresponding to device 410, from the set of pointers. After repeating the loop 634 for the remaining (if any) PDOs, at message 650, the mask filter driver 402 provides the edited set of pointers to the PnP manager 108. At legend 710 in FIG. 7, as a consequence of the PnP manager 108 not being able to see a reference to the PDO 414, the PnP manager 108 does not do procedures for PDO 414. That is, the PnP manager 108 does enter loop 530, but does not encounter PDO 414 in this loop.

Figure 8:
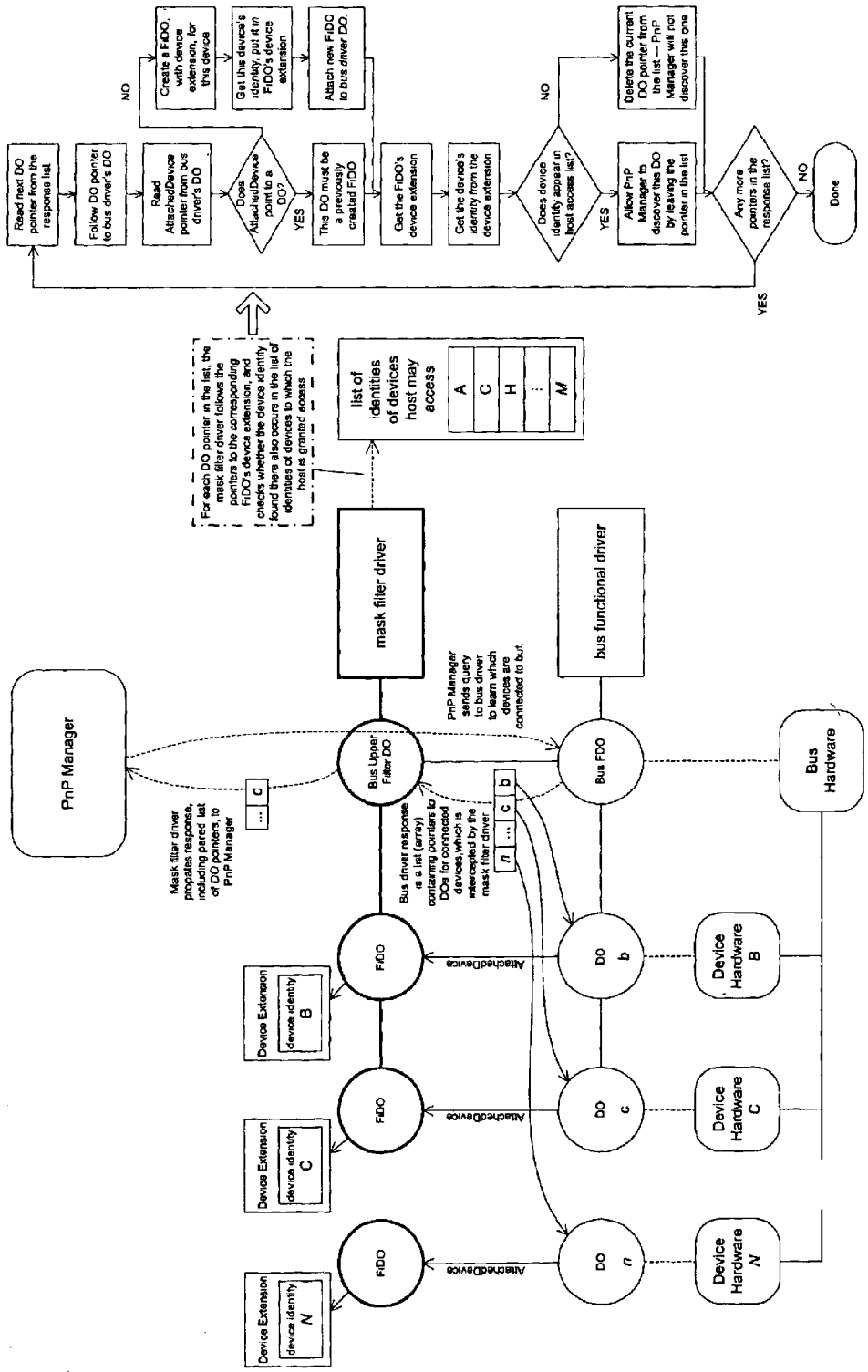
FIG. 8 is a combined software block diagram and flowchart according to another embodiment of the invention.

FIG. 8 is a combined software block diagram and flowchart according to another embodiment of the invention. As a practical matter, FIG. 8 is a combination of FIGS. 4 and 6–7, hence no further discussion of FIG. 8 is provided.

Referring back to FIG. 4, it should be understood that the mask filter driver 402 has prevented the host 401 from accessing the device 410 by suppressing the generation and attachment of the following to stack 412: of an FDO (corresponding to the FDO 124 of stack 406); and (possibly if a lower and/or upper filter driver are present) FiDOs (corresponding to the FiDOs 122 and 126 of stack 406). It has also prevented the PnP Manager from becoming aware of the PDO and creating an active devnode for the stack, preventing it from notifying consumers that might access the device via the PDO despite the lack of an FDO of the existence of the new device.

To restate, an embodiment of the invention is a filter driver for bus, e.g., SCSI port, devices. The filter driver attaches an FiDO above the FDO for SCSI-like SAN host bus adapters (HBAs). When the PnP manager queries the HBA device stack to discover connected devices, the query request and the response thereto must pass through the mask filter driver. For each pointer to a connected device PDO that is returned, the mask filter driver determines the device's unique identifier (ID), and then checks this ID against product configuration information to determine if the device is one to which the host machine is granted access.

If access has not been granted, the mask filter driver removes the pointer to that PDO from the set of pointers being returned by the HBA driver, so that the PnP manager will not see it. Because it is not included in the set, the PDO is not designated as a true PDO, and the corresponding device stack is not completed and activated. Accordingly, no class function driver will be invoked to create an FDO for the device. Typical consumers cannot find the device object 414. Even a specialized consumer that can find the device object 414 cannot invoke device class-specific features provided by the corresponding function driver because that driver is unaware of the device and does not have an FDO in the stack 412 based on DO 414.

According to another embodiment of the invention, if the host is granted access to a logical unit (again treated as a device connected to the bus) while the host is online, this change is communicated to the mask filter driver. The mask filter driver can notify the PnP manager of a change on the bus (HBA). In response, the PnP manager can issue a new discovery request to the HBA. This time, the mask filter driver would not remove the pointer to the corresponding DO from the returned set. Consequently, the DO becomes a true PDO and thus a basis for a complete device stack and an active devnode. The corresponding function driver and filter drivers are notified of the new device so that they can create an FDO and FiDOs for the device to which access has just recently been granted. This make the device accessible to typical consumers.

Also, access by a host to a logical unit can be revoked while the host is online via the mask filter driver according to an embodiment of the invention. The storage manager program (an application running on the same host or another host not depicted) can direct a configuration manager (not depicted) in the affected host to destroy the device stack, which includes removing the FDO from the stack and destroying the FDO. Subsequently, if the PnP manager is notified to query the bus for connected devices, the mask filter driver will once again hide the DO from the PnP manager.

As an alternative, the existence of device objects can be managed so as to manipulate the availability of devices to consumers by supplying a replacement for the function driver responsible for creating corresponding FDOs. But this requires more code and is more intrusive. In contrast, the mask filter driver according to embodiments of the invention requires less code and is less intrusive because it works in conjunction with the PnP manager and the typical function drivers provided in a WDM-compliant architecture. Not replacing the function drivers decreases the possibility that the device object management will introduce compatibility or stability problems.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. A filter driver code arrangement on a computer-readable medium for use in a system having a bus, a host connected to said bus and one or more devices connected to said bus, execution of said code arrangement by one or more processors of the host preventing access by said host to any of said devices for which said host does not have respective access permission, the code arrangement comprising:

an intercept code portion to intercept a set of data identifying one or more devices connected to said bus, respectively;

a determination code portion to determine, based upon the data set and a permission set representing permission relationships between said host and said one or more devices, whether said host has permission to access each of said one or more devices; and a change code portion to change said data set to block access by said host to any of said one or more devices for which said host does not have access permission.

2. The computer-readable code arrangement of claim 1, wherein said data set is a set of pointers pointing to device objects (DOs) that represent said one or more devices, respectively.

3. The computer-readable code arrangement of claim 2, wherein said DOs pointed to by said set of pointers are first DOs;

the code arrangement further comprising:
a recognition code portion to recognize as being new any member of said data set for which the corresponding first DO does not yet have a related device object associated therewith;
a create code portion to create second DOs for the new members of said data set;
an associate code portion to associate first DOs with the corresponding new second DOs;
an extender code portion to set a field in each new second DO, the content of said field representing the identity of the corresponding device.

4. The computer-readable code arrangement of claim 3, wherein said determination code portion is, for each pointer in said data set, operable to
obtain the identifier (ID) of the device corresponding to the DO to which the pointer points and treat as the current ID,
compare the current ID against IDs of devices indicated by said permission set in order to reveal whether said host has access permission on said device corresponding to the DO to which the pointer points, and
remove the pointer corresponding to the current ID from said data set if said host does not have access permission.

5. The computer-readable code arrangement of claim 4, wherein said permission set indicates either devices for which said host is permitted to have access or devices for which said host is not permitted to have access.

6. The computer-readable code arrangement of claim 3, wherein said second DOs are filter DOs (FiDOs) and said first DOs are physical DOs (PDOs).

7. The computer-readable code arrangement of claim 3, wherein said extender code portion is further operable to query, with respect to each new second DO, in order to obtain an identifier for the corresponding device.

8. The computer-readable code arrangement of claim 2, wherein
said DOs pointed to by said set of pointers are first DOs;
said first DOs are associated with second DOs, respectively;
each first DO has a field, the content of which points to the corresponding second DO;
each second DO has a field, the content of which represents the identity of the corresponding device; and
said determination code portion is, for each pointer in said data set, operable to
obtain the ID of the device corresponding to the DO to which the pointer points and treat as the current ID,
compare the current ID against IDs of devices indicated by said permission set in order to reveal whether said host has access permission on the device corresponding to the current ID, and
remove the pointer corresponding to the current ID from said data set if said host does not have access permission.

9. The computer-readable code arrangement of claim 1, wherein a higher level code portion that originally requested said data set is a plug and play manager.

10. The computer-readable code arrangement of claim 1, wherein said code arrangement conforms to the WINDOWS Driver Model (WDM) architecture.

11. The computer-readable code arrangement of claim 1, wherein said system is a storage area network and said one or more devices include at least one logical unit.

12. The computer-readable code arrangement of claim 11, wherein said host is operable to run an application program that is a consumer of services of said at least one logical unit.

13. A method, for use in a system having a bus, a host connected to said bus and one or more devices connected to said bus, the method preventing access by said host to any of said devices for which said host does not have respective access permission, the method comprising:
intercepting a set of data identifying one or more devices connected to said bus, respectively;
determining, based upon the data set and a permission set representing permission relationships between said host and said one or more devices, whether said host has permission to access each of said one or more devices; and
changing said data set to block access by said host to any of said one or more devices for which said host does not have access permission.

14. The method of claim 13, wherein said data set is a set of pointers pointing to device objects (DOs) that represent said one or more devices, respectively.

15. The method of claim 14, wherein
said DOs pointed to by said set of pointers are first DOs;
the method further comprising:
recognizing as being new any member of said data set for which the corresponding first DO does not yet have a related device object associated therewith;
creating second DOs for the new members of said data set;
associating first DOs with the corresponding new second DOs;
setting a field in each new second DO, the content of said field representing the identity of the corresponding device.

16. The method of claim 15, wherein said determining of whether said host has permission, for each pointer in said data set, includes
obtaining the ID of the device corresponding to the DO to which the pointer points and treating as the current ID,
comparing the current ID against IDs of devices indicated by said permission set in order to reveal whether said host has access permission on said device corresponding to the DO to which the pointer points; and
removing the pointer corresponding to the current ID from said data set if said host does not have access permission.

17. The method of claim 16, wherein said permission set indicates either devices for which said host is permitted to have access or devices for which said host is not permitted to have access.

18. The method of claim 15, wherein said second DOs are filter DOs (FiDOs) and said first DOs are physical DOs (PDOs).

19. The method of claim 15, wherein said setting of said field includes querying, with respect to each new second DO, in order to obtain an identifier for the corresponding device.

20. The method of claim 14, wherein said DOs pointed to by said set of pointers are first DOs;

said first DOs are associated with second DOs, respectively;

each first DO has a field, the content of which points to the corresponding second DO;

each second DO has a field, the content of which represents the identity of the corresponding device; and said determining of whether said host has permission includes obtaining the ID of the device corresponding to the DO to which the pointer points and treating as the current ID, comparing the current ID against IDs of devices indicated by said permission set in order to reveal whether said host has access permission on said device to which the pointer points; and removing the pointer corresponding to the current ID from said data set if said host does not have access permission.

21. The method of claim 13, further comprising passing the changed data set to a plug and play manager.

22. The method of claim 13, wherein said system is a storage area network and said one or more devices include at least one logical unit representing a memory unit or other particular function of a greater device.

23. The method of claim 22, wherein said host is operable to run an application program that is a consumer of services of said at least one logical unit.

24. A host device in a system having a bus and one or more devices connected to said bus, wherein the host is connected to said bus, the host being prevented from accessing any of said devices for which said host does not have respective access permission by loading and executing a code arrangement according to claim 1.

25. An apparatus in a system having a bus, and one or more devices connected to said bus, wherein the host is connected to said bus, for preventing the host from accessing any of said devices for which said host does not have respective access permission, the apparatus comprising:

intercept means for intercepting a set of data identifying one or more devices connected to said bus, respectively, determination means for determining, based upon said data set and a permission set representing permission relationships between said host and said one or more devices, whether said host has permission to access each of said one or more devices, and change means for changing said data set to block access by said host to any of said one or more devices for which said host does not have access permission.

* * * * *

UNITED STATES PATENT AND TRADEMARK OFFICE
CERTIFICATE OF CORRECTION

PATENT NO. : 6,820,146 B2  
APPLICATION NO. : 10/260291  
DATED : November 16, 2004  
INVENTOR(S) : David Peyton Cox It is certified that error appears in the above-identified patent and that said Letters Patent is hereby corrected as shown below:

On the Title Page item:  
(75) Inventor: "David Pevton Cox" should be --David Peyton Cox--.

Column 2,  
Line 67, after "PnP", delete ",".

Column 3,  
Line 66, after "to", delete "the".

Column 5,  
Line 33, after "has", insert --been--.

Column 6,  
Line 25, "arc" should be --are--.

Column 8,  
Line 24, "make" should be --makes--.

Signed and Sealed this

Fourth Day of December, 2007

JON W. DUDAS  
*Director of the United States Patent and Trademark Office*